US007133774B2

(12) United States Patent
Hessing et al.

(10) Patent No.: US 7,133,774 B2
(45) Date of Patent: Nov. 7, 2006

(54) METHOD FOR OUTPUTTING DATA IN A VEHICLE AND A DRIVER-INFORMATION DEVICE

(75) Inventors: Bernd Hessing, Holle (DE); Uwe Beutnagel-Buchner, Stuttgart (DE); Thomas Fabian, Hildesheim (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/009,246

(22) PCT Filed: Mar. 4, 2001

(86) PCT No.: PCT/DE01/01247

§ 371 (c)(1),
(2), (4) Date: Apr. 25, 2002

(87) PCT Pub. No.: WO01/75838

PCT Pub. Date: Oct. 11, 2001

(65) Prior Publication Data

US 2002/0138180 A1 Sep. 26, 2002

(30) Foreign Application Priority Data

Apr. 4, 2000 (DE) ................................ 100 16 674

(51) Int. Cl.
*G01C 21/26* (2006.01)

(52) U.S. Cl. ......................................... 701/211; 701/36

(58) Field of Classification Search ................ 701/201, 701/207, 211, 213, 214, 200, 36; 340/988, 340/990, 995; 342/357.01, 357.13
See application file for complete search history.

(56) References Cited

U.S. PATENT DOCUMENTS

| | | | | |
|---|---|---|---|---|
| 5,402,120 | A | 3/1995 | Fujii et al. | |
| 6,006,161 | A * | 12/1999 | Katou | 701/212 |
| 6,009,363 | A | 12/1999 | Beckert et al. | |
| 6,208,934 | B1 * | 3/2001 | Bechtolsheim et al. | 701/209 |
| 6,675,081 | B1 * | 1/2004 | Shuman et al. | 701/48 |

FOREIGN PATENT DOCUMENTS

| | | |
|---|---|---|
| DE | 195 31 822 | 4/1996 |
| DE | 195 31 824 | 4/1996 |
| DE | 195 16 964 | 11/1996 |
| DE | 195 39 641 | 4/1997 |
| DE | 196 25 002 | 1/1998 |
| DE | 196 40 735 | 4/1998 |
| DE | 197 50 778 | 6/1998 |
| DE | 198 10 173 | 10/1999 |
| DE | 198 39 193 | 3/2000 |
| DE | 198 40 120 | 3/2000 |
| EP | 0 542 331 A1 | 5/1993 |
| EP | 0 569 243 | 11/1993 |
| GB | 2 305 262 | 4/1997 |
| JP | 10 272 993 | 10/1998 |

* cited by examiner

*Primary Examiner*—Y. Beaulieu
(74) *Attorney, Agent, or Firm*—Kenyon & Kenyon LLP

(57) ABSTRACT

Proposed is a method for transmitting data in a vehicle, and a driver-information device, where an output unit is connected to processing devices by a data bus. This allows an output for all of the processing devices connected to the data bus to occur centrally in the output unit, whereby, on one hand, only one output unit is necessary for a plurality of processing devices, and on the other hand, processing devices of different manufacturers can be connected to one output unit, when a common data-bus protocol is present.

37 Claims, 4 Drawing Sheets

METHOD FOR OUTPUTTING DATA IN A VEHICLE AND A DRIVER-INFORMATION DEVICE

FIELD OF THE INVENTION

The present invention starts out from a method for outputting data in a vehicle.

BACKGROUND INFORMATION

Driver-information systems, which are each installed in the vehicle as additional devices, together with their own output unit, are already known in vehicles. Examples include navigation devices, car-radio devices, or on-board computers for displaying vehicle parameters such as fuel consumption. The car radio has, for example, a display for the tuned-in station. In addition, display elements for the display of quantities relating to operation and safety are known in vehicles. An example is a combination instrument, which, among the various displays, may indicate the vehicle speed or, as an example of vehicle malfunction, may indicate a brake failure. The combination instrument includes a plurality of displays of quantities relevant to the vehicle, such as the vehicle speed, the engine speed, or the fill level of the tank. While the functions represented in the displays are identical in many vehicles, different manufacturers or different users require the appearance of output units, operating units, or displays to be different. Therefore, it is necessary to produce an appropriate output unit for each different vehicle type, and to connect it to the respective device. In addition, each different device requires its own display.

SUMMARY OF THE INVENTION

In contrast, the method of the present invention has the advantage that the output unit can be spatially separated from a computational device, since the data are transmitted via the data bus. In addition, it is particularly advantageous that, in different vehicles, a processing device can also be connected to various output units adapted to the specific demands of the manufacturer or user, since an interface to the data bus allows communication, using a standardized data-bus protocol. In this context, it is particularly advantageous that the data generated by a processing device and/or by a sensor is available to several possible applications in the vehicle by way of a data-bus connection. On the other hand, the output unit can fetch data from a plurality of processing devices, which may also be different from each other, so that only one output unit is needed for a plurality of devices.

As a processing device, it is especially advantageous to use a navigation device that processes the driving information for a driver of the vehicle, since, in this manner, the same navigation device setting high technical requirements can be used in different vehicle types, while an output unit can be adapted to different vehicle types and user demands.

Furthermore, it is advantageous that a graphics object assigned to the data, or audio data, e.g. a direction arrow to be represented in a display, a road map display, a route to be displayed graphically, or a driving instruction to be acoustically output by the output unit, are processed by the output unit. In this context, graphics data can also contain text information. By this way, graphics data, which are often very extensive, do not have to be transmitted via the data bus, but rather, it is only necessary to transmit the command for generating the graphics object. In this connection, it is advantageous that the form of display is controlled by the output unit, so that, e.g. the display can be color or black and white, depending on the design of the display. The display of the graphics objects can be adapted for different vehicle manufacturers or users, without having to change the processing device that transmits the graphics-object data on the data bus. In the case of voice output, it is advantageous that the output unit can be adapted to the voice of the user, while the navigation device does not have to be set to the voice of a user, since the output unit only processes the voice output from the coded data of the navigation device.

In addition, it is advantageous that, in a memory assigned to the output unit, a plurality of processed graphics objects and/or audio data is already stored, which, in response to a command given by the processing device, e.g. by the navigation device, are loaded from this memory and output without further processing being necessary in each case, so that the display speed is increased.

Furthermore, it is advantageous that graphics data and/or audio data can be transmitted via the data bus. These can include, for example, data from a memory of the processing device, e.g. map data, or current data that the processing device received via an air interface. For example, these updated map data can be warnings of traffic jams or tourist information regarding the surrounding area of the route. By this way, graphics objects, for which neither a processing instruction nor stored data are present in the output unit, can also be represented in the display of the output unit.

Furthermore, it is also advantageous that the processing device logs into the output unit prior to transmitting data via the data bus, since this allows the output unit to select between a plurality of processing devices that transmit data to the output unit, and to initially display the data having the highest priority, i.e. warning information about a vehicle malfunction prior to a driving instruction, which in turn is represented prior to a temperature display of a climate-control system. If priority is assigned to the transmitted data, then a map displayed in a combination instrument may be faded out and a warning symbol faded in during the display of the map, so that a driver can be informed of the defect, e.g. brake malfunction.

In addition, it is advantageous to provide a driver-information device for implementing the method of the present invention, it being particularly advantageous to select an MOST or a CAN bus as a data-bus connection, since these bus systems can also be used to reliably transmit data in a vehicle.

Furthermore, it is advantageous that the data-bus connection has a first channel for commands and a second channel for data to be output. This prevents a command flow on the data bus from being hindered during the transport of extensive amounts of data to be output.

DETAILED DESCRIPTION

Figure 1:
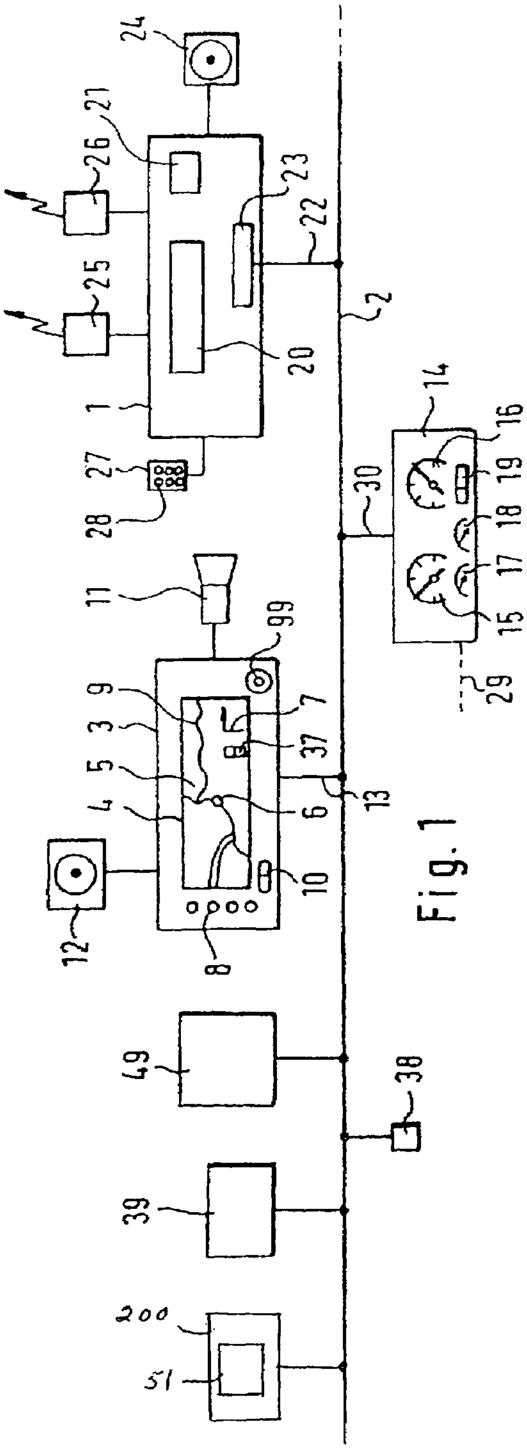
FIG. 1 shows a data bus having various devices connected to it, the data bus particularly connecting a navigation device and an output unit.

The method of the present invention for outputting data is described in light of a driver information device that is represented in FIG. 1. In particular, the driver-information device includes a navigation device 1, which is connected to an output unit 3 via a data bus 2. However, the driver-information device of the present invention and the method are not limited to the use of a navigation device. For example, an on-board computer installed in the vehicle, a car-radio unit, a climate-control device, a video source, e.g. a video camera or a recorder, a personal digital assistant (PDA), a portable computer, e.g. a notebook, a television receiver, a cellular phone, or mobile Internet access can be connected to data bus 2 in place of, or in addition to, a navigation device. All of these devices include at least one processing unit, by which the data generated by them are transmitted on data bus 2. FIG. 1 shows a generic representation of an additional driver-information device 200 provided with its own processing unit 51. These data are output by output unit 3 to a user, in an acoustic manner, or by displaying them in a display assigned to the output unit.

In FIG. 1, a car-radio device 49 and a climate-control device 39, which are not described in further detail, and whose data can also be output by output device 3, are also connected to data bus 2. Output unit 3 has a display 4, in which a map display 5 is shown along with a marking of vehicle position 6. In addition, a direction arrow 7 and a distance indicator 37 are represented in display 4. Roads 9 are drawn into map display 5. Operating elements are also situated on output unit 3: push-buttons 8, a rotary knob 99, and a two-way rocker switch 10. Output unit 3 is also connected to a loudspeaker 11, as well as to a data-storage unit 12, preferably a hard-disk unit or a CD-ROM drive having a storage medium. Output unit 3 is connected to data bus 2 via terminal 13. In addition, a speed sensor 38 for determining the vehicle speed and a combination instrument 14 having a plurality of displays, e.g. a vehicle-speed display 15, an engine-speed display 16, a cooling-water temperature display 17, and a tank fill-level display 18, are connected to data bus 2. Combination instrument 14 has warning indicators 19, which indicate vehicular shortcomings, such as overly low oil pressure, to the driver. Navigation device 1 has a processing unit 20, which is connected to a main memory 21 of navigation device 1. A data connection 22 to the data bus occurs via data-bus interface 23. A storage unit 24, preferably a CD-ROM drive, in which a digital map having a road and route network for navigation is stored, is connected to navigation device 1. Navigation device 1 is also provided with a GPS receiver 25, which is used for determining position. The vehicle position is determined by processing unit 20, from the data of the global positioning system (GPS) satellites received by GPS receiver 25. In addition, navigation device 1 is connected to an air interface 26, e.g. a mobile radio-communications link or a DAB link (digital audio broadcasting), via which the current traffic data can be retrieved from a service control point not shown in FIG. 1. The service control point is an external provider of traffic data, which transmits current traffic data via air interface 26 to navigation device 1, in particular, as requested by navigation device 1. The navigation device is additionally connected to an input unit 27, which is provided with keys 28, and by way of which a destination can be input into navigation device 1. In place of, or in addition to, input unit 27, a preferred embodiment also allows a desired destination to be input using input units 8, 99, and/or 10 of output unit 3, and to be transmitted to navigation device 1 via data bus 2.

Processing unit 20, together with main memory 21, forms a processing device. In addition to the devices shown in FIG. 1, which are connected to data bus 2, it is also possible to connect other processing devices to data bus 2. These can include, for example, a control device for the engine-control unit, for the anti-lock braking system, or for the airbag. However, the preferred exemplary embodiment provides for these safety-related vehicle devices being interconnected by an additional bus system not shown in the figure. The connection of combination instrument 14 to this bus system is denoted by a dashed line 29 so that, in addition to the data received via data input 30, a malfunction of the safety-related vehicle devices can be displayed in the combination instrument.

Using a vehicle position ascertained by GPS receiver 25, and an input destination, processing unit 20 determines, in the navigation device, a route from the ascertained vehicle position to the destination. In this connection, processing unit 20 accesses the digital map, which is stored in storage unit 24 and has the road and route network. From the determined route, processing unit 20 ascertains driving instructions for a driver along the route, as well as a specific digital-map position at which the driving instructions are output to a driver of the vehicle, preferably in front of or at road junctions. In this context, the driving instructions, i.e. driving-information items are preferably transmitted in coded form to output unit 3, which then converts the driving instructions into graphics objects and/or acoustic outputs. The driving instructions are preferably instructions for a driver to follow a certain road or turn onto a certain road. The driving instructions are transmitted with the vehicle position at which these should be output, to output unit 3, by the data of data-bus interface 23 and data bus 2. In this context, the vehicle position is a geographic position, which, for example, is determined by the geographic longitude, the geographic latitude, and possibly the elevation. Along with a driving instruction next to the position at which the driving instruction should be executed by the driver, a preferred exemplary embodiment provides for at least one position on the route being transmitted, which is in front of the position of execution, and at which the driver is informed of a pending driving maneuver, e.g. turning off. Each current vehicle position is transmitted via the data bus to output unit 3. Output unit 3 selects, as a function of the transmitted, current vehicle position, a segment from a map display that is preferably stored in data storage unit 12, the selected segment preferably containing the vehicle position near the center of the display. In a preferred embodiment, the map segment is enlarged when a pending driving maneuver is to be performed in the vicinity of the vehicle position. Apart from the route, segments of roads branching off from the route are not displayed in the magnified view in their entirety, just in a starting region directly adjacent to the route. Road segments that are not a part of the route are displayed so as to be narrower than road segments of the route. In an exemplary embodiment not shown in FIG. 1, it is also possible to dispense with the data storage unit 12 assigned to output unit 3, and to transmit the graphics data necessary for the map display, from the storage unit 24 assigned to navigation device 1, to output unit 3, via data bus 2.

The driving instructions are given by direction arrow 7, which indicates to a driver in which direction he/she should turn off, and by distance indicator 37 in which a distance bar becomes shorter with decreasing distance to the turn-off point, so that a driver is shown how far he/she still has to drive until a driving maneuver specified by direction arrow 7, e.g. a lane change or a turn-off, is to be performed. To support the driving instructions given by distance indicator 37 and direction arrow 7, a voice output is possible through loudspeaker 11, so that a driver does not have to constantly keep display 4 of output unit 3 in his/her field of view. For example, the voice output "turn right after 100 m" is possible in the driving situation shown in map display 5. In addition, a turn-off can be displayed in combination instrument 14 by lighting up a warning indicator 19.

Display 4 is preferably designed as a liquid-crystal display. A preferred exemplary embodiment provides for loudspeaker 11 simultaneously being the loudspeaker of car-radio device 49. In a preferred embodiment, data bus 2 is designed as a CAN bus or an MOST bus. Furthermore, a bus transmission can be carried out in accordance with a TCP/IP protocol. Other bus systems such as IEEE1394 (fire wire) or USB are also possible.

Figure 2:
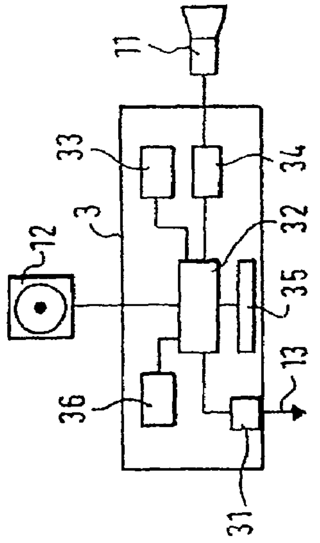
FIG. 2 shows the functional elements of an output unit according to the present invention.

The circuit arrangement of the components of output unit 3 is represented in detail in FIG. 2. Identical reference numerals are used for the same elements. The data transmitted by data bus 2 are passed on to a data-bus interface 31 via terminal 13. Output unit 3 is also provided with a processing unit 32, which processes the driving instructions transmitted via the data bus, by selecting the appropriate map segment from data storage unit 12 and displaying it in display 4, using a display control unit 33. A connection from display control unit 33 to display 4 is not shown in FIG. 2. From the data transmitted via data bus 2, processing unit 32 also determines the vehicle position 6 that is drawn into map display 5. In addition, distance indicator 37 and direction arrow 7, which are output in response to the specific display position being reached, preferably when the current vehicle position coincides with the position corresponding to the driving instructions, are calculated from the driving instructions transmitted via data bus 2. Driving instructions are output in the form of speech, using a voice output unit 34 and loudspeaker 11. Data are temporarily stored in main memory 35 during the processing of the driving instructions, the graphics objects, and/or the voice output. In particular, several driving instructions, which are output in a part of the route that is still to be driven, can be stored here in coded form, or in an already processed form. Push-buttons 8, two-way rocker switch 10, and rotary knob 99 can be selected by input unit 36, the input via data-bus interface 31 and data bus 2 being transmitted to the devices connected to data bus 2, preferably navigation device 1. The map data stored in data-storage unit 12 are optimized for representation in display 4, e.g. a black-and-white or color display. In addition, a preferred exemplary embodiment provides for the map data being adapted to a language of the user. Map data are preferably stored in different scales. In particular, segment enlargements of the map data are stored injunction regions.

In addition to the road and route network, the geographic latitude, the geographic longitude, and, in a preferred embodiment, the elevation of points in the road and route network, are particularly stored in storage unit 24. If the information for a graphical representation is exclusively stored in data storage unit 12, which is preferably a CD-ROM, then graphics data do not have to be stored in storage unit 24.

Figure 3A:
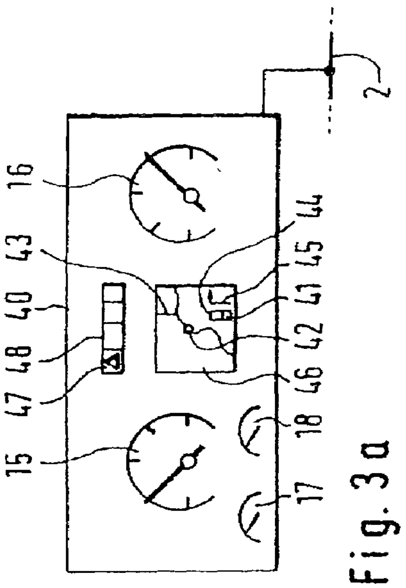
FIG. 3*a* shows the display of a combination instrument according to the present invention, having a navigation map faded into it.
Figure 3B:
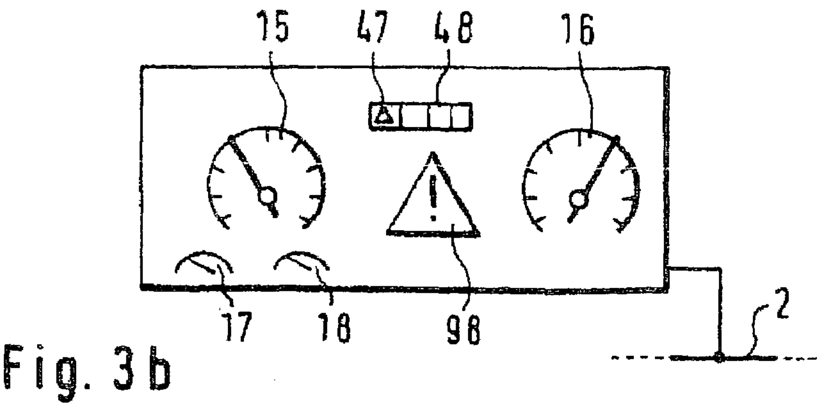
FIG. 3*b* shows the combination instrument from FIG. 3*a*, a warning symbol being superimposed on the map.

A preferred design of the output unit is represented in FIG. 3*a*, where an output unit 40 also includes a combination instrument, so that only one additional display is necessary in the vehicle. In addition to the vehicle-speed indicator 15, engine-speed indicator 16, coolant-temperature indicator 17, and tank-level indicator 18, a map 41 having a vehicle position 42 in a road network 43, as well as driving instructions in the form of a distance bar 44 and a direction arrow 45, is displayed in output unit 40. In addition, warning fields 48 having warning symbols 47 are situated in output unit 40. Output unit 40 is connected to data bus 2 and replaces both output unit 3 and combination instrument 14 in FIG. 1. In a first exemplary embodiment, a display 46, preferably a liquid-crystal display, is introduced into output unit 40 and, in its size, only includes the region of map 41. The remaining instruments, warning fields 48, and scale instruments 15, 16, 17, 18 are conventional pointer instruments or illuminated symbol fields, which are preferably operated by stepper motors, or using light-emitting diodes. In a further exemplary embodiment, it is also possible to provide for the entire output unit being a display, preferably a liquid-crystal display, so that even the scale instruments, such as the speed indicator, are not designed as a separate component, but are realized as a graphic representation in the display of output unit 40. In both exemplary embodiments, it is possible to superimpose the display of map 41 with a display that has a higher priority, e.g. a warning indicator 98, as is represented in FIG. 3*b*. In this manner, a driver is warned in the event of a vehicle malfunction, e.g. too low an oil pressure or a failure of a brake, and is not distracted by an information item having a lower priority, e.g. a driving instruction.

Figure 4A:
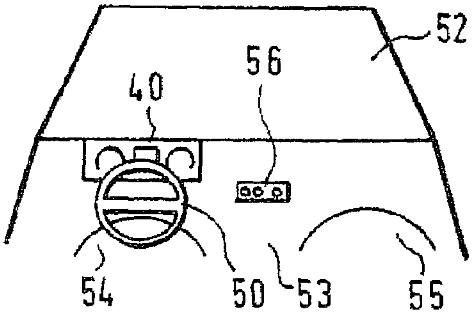
FIGS. 4*a* and 4*b* show possible locations for mounting a combination instrument or a navigation device in a vehicle.

Drawn into FIG. 4*a* is a possible mounting location for output unit 40, which is situated in front of a driver, behind a steering wheel 50, and is underneath windshield 52, in front of the driver. Operating elements 56, which are available to both the driver and the passenger, are drawn into the region of center console 53, between a footwell 54 of the driver and a footwell 55 of the passenger.

Figure 4B:
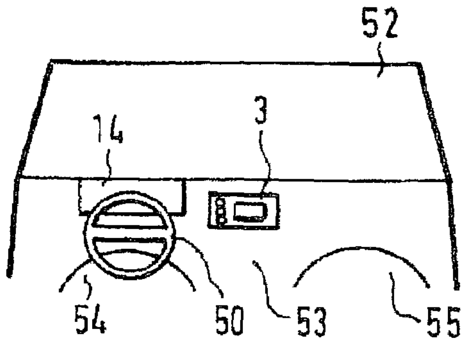

In FIG. 4*b*, a set-up of output unit 3 according to the description of FIG. 1 is drawn into a center console 53 of a vehicle. Combination instrument 14, which is not represented in further detail in FIG. 4*b*, is situated behind steering wheel 50, in front of the driver.

Figure 5:
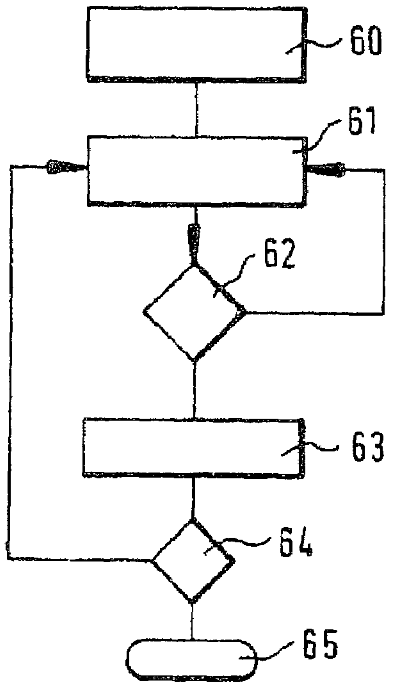
FIG. 5 shows a method for transmitting data according to the present invention.

A method of the present invention for transmitting data from navigation device 1 to output unit 3 is represented in FIG. 5, this method and the following methods being easily applicable to output unit 40. In an initialization step 60, a driving instruction, which is determined in view of the route, is determined by processing unit 20, along with the vehicle position at which this driving instruction should be output. In addition, navigation device 1 announces itself to output unit 3, via data bus 2, as a connected device, by transmitting an identification signal. In a subsequent interrogation step 61, navigation device 1 queries output unit 3 via the data bus, as to whether data should be transmitted. In a first test step 62, output unit 3 tests if data having a high priority are lined up for display, and if main memory 35 is offering enough storage space. If the display can be carried out, then the method branches off to data-transmission step 63, in which the data are transmitted from navigation device 1 to output unit 3. In a subsequent, second test step 64, navigation device 1 checks if the destination has been reached or if additional driving instructions are present. If this is not the case, then an end step 65 is carried out, and the method is ended. If there are driving instructions that still need to be executed, then interrogation step 61 is repeated. Interrogation step 61 is also reached from first test step 62, when output unit 3 communicates to navigation device 1 via a data bus 2, that a data transmission to output unit 3 is presently not possible. Initialization step 60 informs output unit 3, from which processing device it is receiving data. Using initialization step 60, the data of other processing units connected to data bus 2 are transmitted to output unit 3, as well. Using the log-on procedure, devices of various manufacturers, which may transmit their data in another form, can transport their data via data bus 2, when an appropriate data-bus format is used, and the data can be interpreted by output unit 3 in a suitable manner.

Because the evaluation of the transmitted data is first carried out by output unit 3, it is possible to use the same navigation device 1 with different types of output units. In a first design of an output unit, e.g. a driving instruction: "Turn right at the next intersection" is output simply by displaying a directional arrow. In an expanded design of an output unit, the turning-off point is additionally indicated in a map display. In a further output unit, a voice output "turn right at next intersection" is also generated. In all three cases, the same, coded driving instruction is transmitted by the navigation device to the output unit, so that the same navigation device 1 can be used for output units, which are different in their performance, and whose designs have different degrees of complication.

Figure 6:
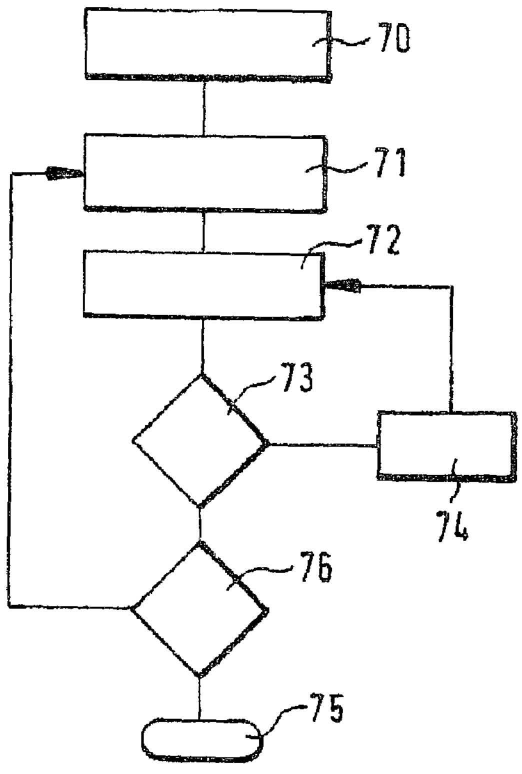
FIG. 6 shows determination of data and the transmission of these data by a navigation device, on a data-bus connection, in accordance with the present invention.

Represented in FIG. 6 is a method of the present invention for transmitting the data on the data bus in navigation device 1. The route and the points of the route, at which driving instructions are to be output to the driver, are determined in a beginning step 70. In a transmission step 71, the next, pending driving instruction is transmitted via the data bus to output unit 3, in accordance with the method described in steps 61 through 64 in FIG. 5. In a subsequent position-determination step 72, a current vehicle position is determined, using GPS receiver 25. It is checked in a subsequent, first test step 73, if the position for the output of the next driving instruction has already been reached. If this is not the case, then the method branches off to a position-transmission step 74, in which the current vehicle position is transmitted via data bus 2 to output unit 3. In a further exemplary embodiment, it is also possible to directly communicate to output unit 3, the distance to the output of the next driving instruction. Position-determination step 72 is then repeated. However, second test step 76 is carried out, when it is determined in first test step 73, that the position for the output of the next driving instruction has been reached or passed. In second test step 76, it is checked if the destination established in beginning step 70 has been reached. If this is the case, then end step 75 is carried out, and the method is ended. But if the destination has not yet been reached, then the method branches back to transmission step 71. In an exemplary embodiment not shown in FIG. 6, it is also possible to directly transmit a plurality of driving instructions in advance, so that, in the case of a possible load on data bus 2 caused by other applications, there is no delay in a display, since the driving instructions stored in main memory 35 are output first.

Figure 7A:
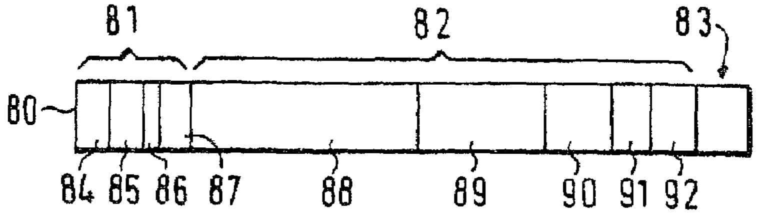
FIGS. 7*a* and 7*b* show data structures of the present invention, for transmission of, e.g. data of a navigation device, via the data bus.
Figure 7B:
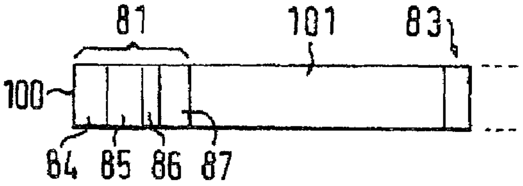

Represented in FIGS. 7*a* and 7*b* are exemplary embodiments for data formats, in which data are transported from navigation device 1, via data bus 2, to output unit 3. A data record for a driving instruction is represented in FIG. 7*a*. Data record 80 has a head region 81, a data section 82, and an end region 83. In a first data field 84 of the head region, it is determined from whom the data originate, e.g. from navigation device 1. In a second data field 85, it is established for whom the data are meant, i.e. for output unit 3. In a third data field 86, it is determined what the data contain, i.e. a driving instruction, and, in a fourth data field 87, it is established what the size of the data is. In data section 82, the driving instruction is stored in a first data field 88 in coded form, e.g. a code for the instruction "turn sharply to the right" or "turn left at second cross-street". In this context, the individual driving instructions are subdivided into individual parameters; e.g. for a direction, right or left; for a maneuver, turn off, turn around, change lanes; and for an instruction element, first pass side road on right/left, and, first go right/left at fork. The geographic position at which the driving instruction is to be output to a driver is stored in a second data field 89. Whether or not a driving instruction shall be output acoustically, is stored in a third data field 90. A scale ranking is stored in a fourth data field 91. The scale ranking specifies the scale for displaying the map displays upon reaching the position, at which the driving instruction is to be output. Thus, it is possible to enlarge the map display in front of major intersections, in order to give the driver a better overall view of the road routing. The priority of the displayed data is stored in a fifth data field 92. However, a preferred exemplary embodiment can also provide for the priority being previously assigned a fixed value by the output unit for the navigation device. End region 83 marks the end of data record 80. More data fields can be added in all regions of data record 80, by establishing them in a data-bus protocol.

Represented in FIG. 7*b* is the data record 100 for position data regarding the current vehicle position. In the header region, data record 100 has the same data fields as data record 80 in FIG. 7*a*. Stored in data area 101 are position data, which, in a preferred embodiment, are stored by specifying a geographic degree of longitude and latitude for each. In addition, the position data can be present in the form of WGS 84 coordinates (WGS=World Geographic System).

Figure 8:
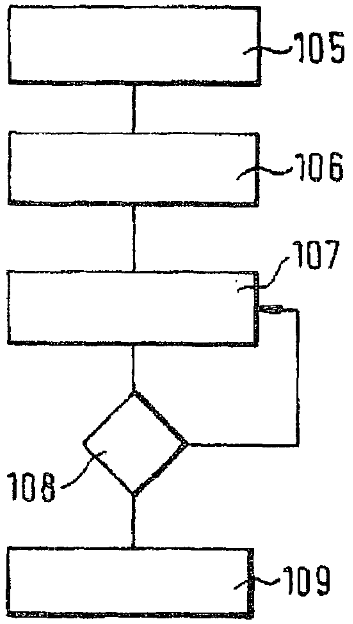
FIG. 8 shows a method of the present invention, for the reception of data by the output unit.
Figure 9:
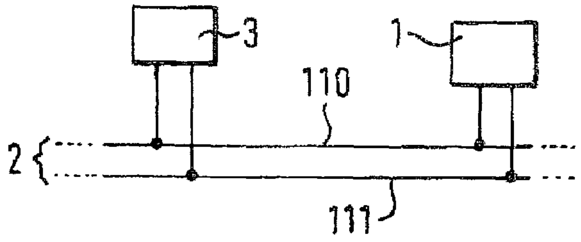
FIG. 9 shows a further exemplary embodiment for connecting devices, using a data-bus connection.

In FIG. 8, the method of the present invention is represented in detail for the reception and processing of a driving instruction by output unit 3. In receiving step 105, a driving instruction transmitted from navigation device 1 via data bus 2 to output unit 3 is received by output unit 3. In a subsequent processing step 106, processing unit 32 processes a graphical representation of the driving instruction, e.g. a direction arrow, in display 4 and stores the processed display of the driving instruction and a processed voice output in main memory 35 of output unit 3. In a subsequent position-transmission step 107, output unit 3 receives a current vehicle position determined by the navigation device. In a subsequent step 108, output unit 3 checks the distance between the current vehicle position and the point, at which the driving instruction transmitted in receiving step 105 should be output. If this point is not yet reached, then the method branches back to position-transmission step 107. But if this point is reached, then the driving instruction processed in calculation step 106 is output in an output step 109, by display 4 and/or loudspeaker 11. An additional transmission of graphics data is particularly necessary, when a map display is only stored in storage unit 24, or when additional graphics data should be transmitted from storage unit 24. Additional graphics data from a service control point, e.g. an Internet provider, can also be loaded into navigation device 1 via air interface 26. In a preferred exemplary embodiment, air interface 26 itself can be directly connected to data bus 2. Therefore, FIG. 9 represents an exemplary embodiment for transmitting graphics data, where data bus 2 has a first channel 110 and a second channel 111. Output unit 3 and navigation device 1 are represented in a simplified manner. Data having a small data set, e.g. commands, or data corresponding to the data formats described in FIGS. 7*a* and 7*b* are transmitted via first channel 110. Second channel 111 is used to transmit graphics data, so that the transmission of a large graphics file does not hinder the data transmission of commands via first channel 110. In particular, the display of warning instructions transmitted via first channel 110 is not hindered. Graphics data may be transmitted in the form of bitmap formats, vector formats, or in the form of metaformats, which represent a combination of bitmap and vector formats.

Figure 10:
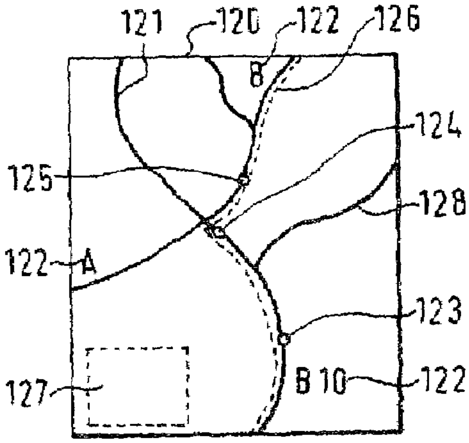
FIG. 10 shows a map represented in a display unit.
Figure 11:
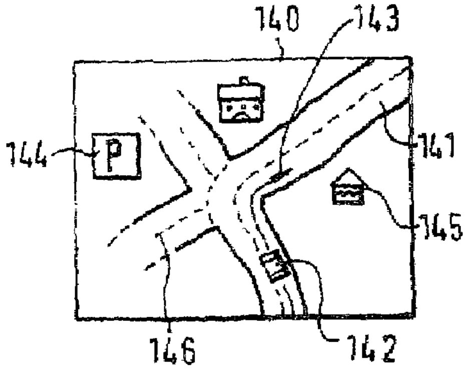
FIG. 11 shows a display according to the present invention, of an enlarged segment of the map, in front of a turn-off point.
Figure 12A:
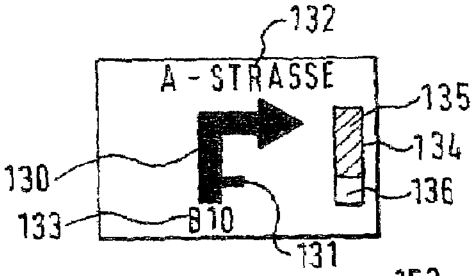
FIGS. 12*a*, 12*b*, and 12*c* outputs of driving instructions according to the present invention, for different vehicle positions in the map shown in FIG. 10.
Figure 12C:
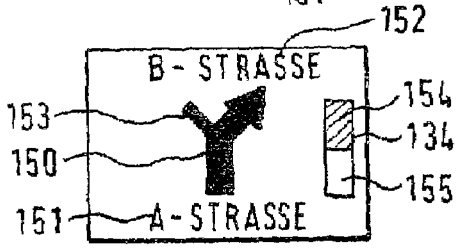
Figure 12B:
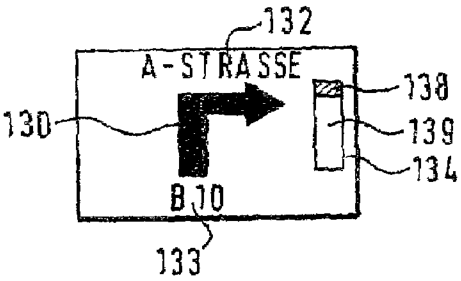

Represented in FIGS. 10 through 12 is a functional sequence of the method according to the present invention, when it is used for an output unit that is in the form of a display unit and a navigation device. A display 120 having a map display of a road network 121 is represented in FIG. 10. A route 126 planned by the navigation device is indicated by a dashed line. Road designations 122 are also marked onto road network 121. In FIG. 10, a first vehicle position 123, a second vehicle position 124 in front of a junction, and a third vehicle position 125 after the branching-off of route 126 are represented along route 126. In FIGS. 12*a*–12*c*, various outputs of driving instructions are represented, which, in a first exemplary embodiment, are output in the region 127 of display 120 drawn in using a dashed line. In a further exemplary embodiment, it is also possible to display the driving instructions shown in FIGS. 12*a* through 12*c* next to the map display shown in FIG. 10; in this case, the area of the display exceeding the area of the display 120 shown in FIG. 10.

The vehicle positions drawn into FIG. 10 are not simultaneously represented in display 120, but rather, the vehicle position is moved along the traveled route 126, using the position data transmitted to output unit 3. At the first vehicle position 123, the driving instructions shown in FIG. 12*a* are displayed in region 127. A direction arrow 130 that bends to the right stands for a bend in route 126. However, a side road 128, which branches off to the right and is not used, must first be passed before one turns off. For this reason, direction arrow 113 is wider at point 131, which symbolizes side road 128. A designation 132 for a target road is indicated above the direction arrow. A designation 133 for the road on which the driver is presently traveling is indicated beneath the direction arrow. These data have preferably been transmitted to output unit 3 on the digital map stored in storage unit 24. Displayed next to direction arrow 130 is a distance bar 134, which has a first region 135 and a second region 136, an increase in size of second region 136 relative to first region 135 symbolizing to the driver that the point, at which he/she should turn off in the direction indicated by direction arrow 130, is being approached.

At second vehicle position 124, the vehicle has approached the turn-off point. The display in FIG. 12*b* is output as the driving instruction, the display of direction arrow 130 no longer having a point of widening 131 for side road 128, since it was already passed. As an addition, the instruction "after 40 meters, turn right onto the next road" is output, using a voice output. Distance bar 138 has become shorter, so that a driver is informed of the direct approach of the turn-off point. At second vehicle position 124, an enlarged map 140, as is represented in FIG. 11, is shown in the display in place of the map shown in FIG. 10. Enlarged map 140 shows a magnified view of an intersection, which is in front of second vehicle position 124, and is shown in display 120. In addition to the roads 141 of the route, vehicle position 142 is marked on the map. The direction of travel is represented by a direction arrow 143. Only the beginning sections 146 of roads not belonging to route 126 are displayed in the enlarged map, preferably in a different color. In an exemplary embodiment not shown in FIG. 11, the turn-offs can be displayed so as to be narrower than the roads of the route. In a preferred embodiment, symbols indicate important points on the route, e.g. 144 for a parking lot or 145 for a swimming pool. In a preferred embodiment, these important points, which are used to orient the driver, are only in enlarged map 40, but are not shown in the standard display of road network 121 in FIG. 10. However, a display in both maps is also possible through an appropriate selection by the user.

A driving instruction that is displayed at third vehicle position 125 is represented in FIG. 12*c* by a direction arrow 125. In this case, current road 151, the road 152 to be selected next, a turn-off 153 not to be selected, as well as a bar 154, 155 for the distance to the next junction are also represented. The driving instruction shown in FIG. 12*c* is to be transmitted from navigation device 1 to output unit 3, after the driving instruction given in FIG. 12*b* is output.

What is claimed is:

1. A method for outputting data in a vehicle, comprising the steps of:

connecting to a data bus a plurality of processing devices of a corresponding plurality of driver-information devices;

storing graphics data on a storage device connected to the data bus;

causing a processing device of one of the driver-information devices to generate the data;

transmitting the data from the processing device on the data bus, an output unit being connected to the data bus;

causing the output unit to receive the data via the data bus;

transmitting the graphics data from the storage device to the data bus;

processing the data that is received by the output unit; and causing the output unit to output the data that is processed.

2. The method according to claim 1, wherein:

the data includes at least one of vehicle data and driving-information items.

3. The method according to claim 1, wherein:

the data bus is digital.

4. A method for outputting a driving-information item generated by a navigation device using an output unit, a plurality of processing devices of a corresponding plurality of driver-information devices being connected over a data bus to only one output unit, the navigation device being among the plurality of driver-information devices, the method comprising the steps of:

assigning the driving-information item a position in a digital map;

storing graphics data on a storage device connected to the data bus;

ascertaining a vehicle position by the navigation device;

transmitting the driving-information item with a corresponding position, via the data bus, to the output unit;

transmitting the vehicle position to the output unit;

transmitting the graphics data from the storage device to the data bus; and outputting, via the output unit, the driving-information item as a function of at least one of the position assigned to the driving-information item and of the vehicle position.

5. The method according to claim 4, wherein:

the driving-information item includes driving instructions.

6. The method according to claim 4, further comprising the step of:

displaying a map having a road and route network simultaneously to the output of the driving-information item.

7. The method according to claim 6, further comprising the step of:

ascertaining a segment of the map containing the vehicle position by one of the output unit and the navigation device; and displaying the segment by the output unit.

8. The method according to claim 6, further comprising the step of:

assigning the driving-information item a scale ranking; and selecting a scale of the segment as a function of the scale ranking.

9. The method according to claim 8, wherein:

the step of assigning the scale ranking is performed by the navigation device.

10. The method according to claim 4, further comprising the step of:

outputting the driving-information item by the output unit in response to a distance value of a distance from the position assigned to the driving-information item to the vehicle position falling below a preselected distance value.

11. The method according to claim 4, further comprising the steps of:

causing the output unit to process at least one of a graphics object and audio data, the graphics object being assigned to the driving-information item and the audio data being assigned to the driving-information item and relating to a voice output;

storing the graphics object and the audio data in a memory assigned to the output unit; and causing the output unit to output the graphics object and the audio data in a corresponding one of a display and a loudspeaker.

12. The method according to claim 4, further comprising the steps of:

transmitting at least one of a graphics object that is at least one of processed and stored in a processing device and audio data that is at least one of stored and processed in the processing device via the data bus to the output unit; and the graphics object that is at least one of processed and stored in the processing device and the audio data that is at least one of stored and processed in the processing device are output by the output unit.

13. The method according to claim 4, further comprising the step of:

by request of a processing device to the output unit, via the data bus, logging on to the processing device for transmission of data to the output unit;

granting the processing device permission by the output unit, via the data bus, to transmit data; and after the permission is processed, causing the processing device to transmit the data to the output unit.

14. A driver-information system, comprising:

an output unit;

a plurality of driver-information devices, each driver information device including a processing device;

a storage device connected to the output unit and for storing graphics data; and a data-bus connecting the output unit and each processing device of the driver-information devices, wherein:

each processing device is able to generate data, the data is transmittable via the data-bus to the output unit, the graphics data is transmitted from the storage device to the output unit, the output unit is able to process the data, and the output unit is able to output the data.

15. The driver-information system according to claim 14, further comprising:

a storage unit, wherein:

one of the processing devices is part of a navigation device for determining a route in a road and route network, from a starting point to a destination, the navigation device is connected to the storage unit, a digital map for the road and route network is stored in the storage unit, a driving instruction for a trip in the road and route network can be generated by the navigation device, a position in the digital map is assignable to the driving instruction, the driving instruction and the assigned position are the data that can be transmitted via the data-bus to the output unit, and a driving-information item can be output by the output unit in response to a preselected distance between a vehicle position and the position assigned to the driving-information item being reached.

16. The driver-information system according to claim 14, further comprising:

an input unit situated at the output unit, wherein:

data that for control can be transmitted by the input unit via the data-bus to selected ones of the processing devices.

17. The driver-information system according to claim 14, further comprising:

a display unit situated at the output unit, wherein:

the display unit is situated in a region that is in one of a center console of a vehicle and in front of a driver.

18. The driver-information system according to claim 17, wherein:

the display unit is integrated into a combination instrument having a plurality of display devices.

19. The driver-information system according to claim 17, wherein:

the display is a liquid-crystal display.

20. The driver-information system according to claim 17, wherein:

a priority is assigned to one of the data to be output and to information items, and data having the highest priority are output first.

21. The driver-information system according to claim 14, wherein:

the data-bus includes at least a first channel for commands and a second channel for data to be output.

22. The method according to claim 1, wherein:

the plurality of driver-information devices includes at least two of a car radio, a personal digital assistant, a notebook computer, a television receiver, a cellular phone, and a mobile Internet access device.

23. The method according to claim 4, wherein:

the plurality of driver-information devices includes the navigation device and at least one of a car radio, an on-board computer, a climate-control device, a video camera, a video recorder, a personal digital assistant, a notebook computer, a television receiver, a cellular phone, and a mobile Internet access device.

24. The driver-information system according to claim 14, wherein:

the plurality of driver-information devices includes at least two of a navigation device, a car radio, an on-board computer, a climate-control device, a video camera, a video recorder, a personal digital assistant, a notebook computer, a television receiver, a cellular phone, and a mobile Internet access device.

25. The method according to claim 1, wherein:

the output unit is the only output unit and includes one of a display and a loudspeaker, and the output unit is connected to the data bus via a terminal.

26. The driver-information system according to claim 14, further comprising:

a terminal via which the output unit is connected to the data bus, wherein:

the output unit is the only output unit and includes one of a display and a loudspeaker.

27. A method for outputting data in a vehicle, comprising the steps of:

connecting a plurality of driver-information devices and only one output unit to a data bus via a terminal, the output unit including one of a display and a loudspeaker;

causing a processing device of one of the driver-information devices to generate the data;

storing graphics data on a storage device connected to the data bus transmitting the data from the processing device on the data bus, an output unit being connected to the data bus;

transmitting the graphics data from the storage device to the data bus;

causing the output unit to receive the data via the data bus;

processing the data that is received by the output unit; and causing the output unit to output the data that is processed.

28. The method according to claim 27, wherein:

the data includes at least one of vehicle data and driving-information items.

29. The method according to claim 27, wherein:

the data bus is digital.

30. The method according to claim 27, further comprising the steps of:

storing at least one of a plurality of processed graphics objects and processed audio data in a memory assigned to the output unit; and outputting at least one of audio data assigned to a driving-information item and a stored graphics object assigned to the driving-information item.

31. A driver-information system, comprising:

only one output unit including one of a display and a loudspeaker;

a plurality of driver-information devices, each driver information device including a processing device;

a terminal;

a data-bus connecting the output unit and each processing device of the driver-information devices via the terminal; and a storage device connected to the data-bus and for storing graphics data, wherein:

each processing device is able to generate data, the data is transmittable via the data-bus to the output unit, the graphics data is transmitted from the storage device to the output unit, the output unit is able to process the data, and the output unit is able to output the data.

32. The driver-information system according to claim 31, wherein:

the data includes at least one of vehicle data and driving-information items.

33. The driver-information system according to claim 31, wherein:

the data bus is digital.

34. The driver-information system according to claim 31, further comprising:

a memory assigned to the output unit and for storing at least one of a plurality of processed graphics objects and processed audio data; and an arrangement for outputting at least one of audio data assigned to a driving-information item and a stored graphics object assigned to the driving-information item.

35. The driver-information system according to claim 31, further comprising:

a storage unit, wherein:

one of the processing devices is part of a navigation device for determining a route in a road and route network, from a starting point to a destination, the navigation device is connected to the storage unit, a digital map for a road and route network is stored in the storage unit, a driving instruction for a trip in the road and route network can be generated by the navigation device, a position in the digital map is assignable to the driving instruction, the driving instruction and the assigned position are the data that can be transmitted via the data-bus to the output unit, and a driving-information item can be output by the output unit in response to a preselected distance between a vehicle position and the position assigned to the driving-information item being reached.

36. The method as recited in claim 1, wherein the graphics data represents one of a direction arrow, a road map display, and a route.

37. The method as recited in claim 1, wherein the graphics data may be formatted according to one of a bitmap format, a vector format, and a metaformat representing a combination of the bitmap format and the vector format.

* * * * *